US012598482B2

(12) United States Patent
Gao et al.

(10) Patent No.: US 12,598,482 B2
(45) Date of Patent: Apr. 7, 2026

(54) MOBILE TERMINAL TEST SYSTEM AND MOBILE TERMINAL TEST METHOD

(71) Applicant: ANRITSU CORPORATION, Kanagawa (JP)

(72) Inventors: Wujie Gao, Kanagawa (JP); Ryota Chinbe, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 360 days.

(21) Appl. No.: 18/187,232

(22) Filed: Mar. 21, 2023

(65) Prior Publication Data

US 2023/0308897 A1     Sep. 28, 2023

(30) Foreign Application Priority Data

Mar. 25, 2022     (JP) ................................. 2022-049336

(51) Int. Cl.
*H04W 24/00*          (2009.01)
*H04W 8/22*           (2009.01)

(52) U.S. Cl.
CPC ............. *H04W 24/00* (2013.01); *H04W 8/22* (2013.01)

(58) Field of Classification Search
CPC ................................ H04W 24/00; H04W 8/22
USPC ......................................................... 455/423
See application file for complete search history.

(56) References Cited

U.S. PATENT DOCUMENTS

| | | | | |
|---|---|---|---|---|
| 2009/0281968 A1* | 11/2009 | Pozzoli | .................... | G06N 5/02 706/11 |
| 2011/0053622 A1* | 3/2011 | Maruo | ....................... | H03J 1/00 455/150.1 |
| 2015/0181022 A1* | 6/2015 | Vaderna | .............. | H04L 41/5003 455/422.1 |
| 2015/0296395 A1* | 10/2015 | Vaderna | ................ | H04W 24/08 370/252 |
| 2018/0357143 A1* | 12/2018 | Panambur | ........... | G06F 11/2289 |
| 2020/0205018 A1* | 6/2020 | Chinbe | ................. | H04W 24/06 |
| 2020/0371001 A1* | 11/2020 | Lekivetz | ............. | G01M 99/005 |
| 2021/0036788 A1* | 2/2021 | Subramanian | ......... | H04B 17/15 |
| 2021/0044994 A1* | 2/2021 | Nakamura | .......... | H04W 88/085 |
| 2021/0099900 A1* | 4/2021 | Nakamura | ............ | H04L 43/045 |

(Continued)

FOREIGN PATENT DOCUMENTS

JP          5112463 B2     1/2013

*Primary Examiner* — Michael Thier
(74) *Attorney, Agent, or Firm* — McDonald Hopkins LLC

(57) ABSTRACT

A parameter calculation unit that calculates, according to one or more input values of a parameter, a value of another parameter, a standard conformance determination unit that determines whether or not the input value of the parameter and the value of the parameter calculated by the parameter calculation unit conform with a 3GPP standard, a parameter adjustment unit that adjusts a value of a parameter, which does not conform with the 3GPP standard, to a value in conformity with the 3GPP standard, and a conformance and nonconformance determination criterion value calculation unit that calculates a conformance and nonconformance determination criterion value of a test case by using at least one of a parameter having a value determined to conform with the 3GPP standard by the standard conformance determination unit and a parameter having a value adjusted by the parameter adjustment unit are included.

4 Claims, 7 Drawing Sheets

(56) References Cited

U.S. PATENT DOCUMENTS

| | | | |
|---|---|---|---|
| 2023/0082676 A1* | 3/2023 | Verma | H04W 24/06 |
| | | | 370/252 |
| 2023/0308897 A1* | 9/2023 | Gao | H04W 8/22 |
| 2023/0328555 A1* | 10/2023 | Kato | H04W 24/06 |
| | | | 455/67.14 |
| 2024/0056836 A1* | 2/2024 | Kovács | H04W 24/06 |
| 2025/0151086 A1* | 5/2025 | Talarico | H04L 5/0041 |

* cited by examiner

| Channel Bandwidth | SCS(kHz) | OFDM | RB allocation | | | | | | | |
|---|---|---|---|---|---|---|---|---|---|---|
| | | | Edge_Full_Left | Edge_Full_Right | Edge_1RB_Left | Edge_1RB_Right | Outer_Full | Inner_Full | Inner_1RB_Left | Inner_1RB_Right |
| 5MHz | 15 | DFT-s | 2@0 | 2@23 | 1@0 | 1@24 | 25@0 | 12@6 | 1@1 | 1@23 |
| | | CP | 2@0 | 2@23 | 1@0 | 1@24 | 25@0 | 13@6 | 1@1 | 1@23 |
| | 30 | DFT-s | 2@0 | 2@9 | 1@0 | 1@10 | 10@0 | 5@2 | 1@1 | 1@9 |
| | | CP | 2@0 | 2@9 | 1@0 | 1@10 | 11@0 | 5@2 | 1@1 | 1@9 |
| | 60 | DFT-s | N/A | N/A | N/A | N/A | N/A | N/A | N/A | N/A |
| | | CP | N/A | N/A | N/A | N/A | N/A | N/A | N/A | N/A |
| 10MHz | 15 | DFT-s | 2@0 | 2@50 | 1@0 | 1@51 | 50@0 | 25@12 | 1@1 | 1@50 |
| | | CP | 2@0 | 2@50 | 1@0 | 1@51 | 52@0 | 26@13 | 1@1 | 1@50 |
| | 30 | DFT-s | 2@0 | 2@22 | 1@0 | 1@23 | 24@0 | 12@6 | 1@1 | 1@22 |
| | | CP | 2@0 | 2@22 | 1@0 | 1@23 | 24@0 | 12@6 | 1@1 | 1@22 |
| | 60 | DFT-s | 2@0 | 2@9 | 1@0 | 1@10 | 10@0 | 5@2 | 1@1 | 1@9 |
| | | CP | 2@0 | 2@9 | 1@0 | 1@10 | 11@0 | 5@2 | 1@1 | 1@9 |

FIG. 3

MOBILE TERMINAL TEST SYSTEM AND MOBILE TERMINAL TEST METHOD

TECHNICAL FIELD

The present invention relates to a mobile terminal test system and a mobile terminal test method, and more particularly, to a mobile terminal test system and a mobile terminal test method of having a pseudo base station function capable of communication connection with a mobile terminal and executing a conformance test of the mobile terminal in conformity with the 3GPP standard.

BACKGROUND ART

In recent years, 5G services that operate millimeter waveband frequencies have started in each country, and the production of 5G mobile terminals such as 5G smartphones is in full swing. A design and development company or a manufacturing factory of the 5G mobile terminal performs a performance test of measuring an output level or a reception sensitivity of transmission radio waves via a wireless communication antenna provided in the 5G mobile terminal, and determining whether or not the 5G mobile terminal satisfies a predetermined criterion.

Among such performance tests, there is a conformance test for checking whether or not a mobile terminal or a base station apparatus conforms with the 3rd Generation Partnership Project (3GPP) standard. In the conformance test, a Test Case (TC), in which a test purpose, a conformance and nonconformance determination criterion, a test condition, a test item identified by a Test ID, and a test procedure are defined, is executed.

Patent Document 1 describes a process procedure for shortening a test time by omitting execution of duplicated process items among a plurality of test cases which are executed consecutively.

RELATED ART DOCUMENT

Patent Document

[Patent Document 1] Japanese Patent No. 5112463

DISCLOSURE OF THE INVENTION

Problem that the Invention is to Solve

Each test case in the conformance test of the mobile terminal has many parameters, which are respectively required for measurement. For example, the parameter such as a Test Environment, a frequency (Test Frequency, Operating Band, Downlink Frequency, Uplink Frequency, Downlink Point A, Uplink Point A), a test bandwidth BW (Test Channel Bandwidth, Test EN-DC bandwidth combination), Subcarrier Spacing (SCS), and Synchronization Signal/PBCH Block (SSB) are defined by 3GPP. In a test system that supports the conformance test as disclosed in Patent Document 1, according to these parameters, a simulation signal of a base station is generated and a conformance and nonconformance determination criterion value for RF evaluation items of the mobile terminal to be measured is determined.

In the test system and system software that support the conformance test as disclosed in Patent Document 1, an initial value of the parameter as described above is displayed on a screen. Each parameter is not completely independent and may affect each other. In a case where a test is performed under a condition other than a condition defined by 3GPP, a user will modify any of the parameters. In this case, the other parameters or the conformance and nonconformance determination criterion value may need to be changed to conform with the 3GPP standard. However, if the user does not have a deep understanding of the 3GPP standard, it may not be possible to obtain accurate measurement results, such as being unable to establish a connection between the mobile terminal and the pseudo base station, or having an inappropriate conformance and nonconformance determination criterion value, in some cases. For this reason, the test system in the related art has a problem in that a lot of effort is imposed on the user, such as finding the cause and doing trial and error for resetting.

The present invention is made to solve such problems in the related art, and to provide a mobile terminal test system and a mobile terminal test method capable of easily executing a conformance test in conformity with a 3GPP standard of a mobile terminal, without making a user aware of a mutual influence of each parameter.

Means for Solving the Problem

In order to solve the problem described above, according to the present invention, there is provided a mobile terminal test system that executes a test of a test case in a conformance test defined by a 3GPP standard of a mobile terminal, the mobile terminal test system including: a parameter input unit that inputs a value to some of a plurality of parameters for executing the test of the test case; a parameter calculation unit that calculates a value of another parameter, according to the value of one or more parameters input by the parameter input unit; a standard conformance determination unit that determines whether or not the value of the parameter input by the parameter input unit and the value of the parameter calculated by the parameter calculation unit conform with the 3GPP standard; a parameter adjustment unit that adjusts the value of the parameter determined not to conform with the 3GPP standard by the standard conformance determination unit to a value in conformity with the 3GPP standard; and a conformance and nonconformance determination criterion value calculation unit that calculates a conformance and nonconformance determination criterion value for the test case, by using a plurality of parameters including at least one of a parameter having the value determined to conform with the 3GPP standard by the standard conformance determination unit and a parameter having the value adjusted by the parameter adjustment unit.

With this configuration, the mobile terminal test system according to the present invention is configured such that in a case where a parameter changed by a user and a parameter calculated based on the parameter changed by the user do not conform with the 3GPP standard, their parameters are adjusted to values in conformity with the 3GPP standard. With this configuration, the mobile terminal test system according to the present invention enables the user to freely change the parameter without being aware of a mutual influence of each parameter, and can easily execute a conformance test in conformity with the 3GPP standard on the mobile terminal. That is, the mobile terminal test system according to the present invention facilitates construction and modification of a test condition even if the user does not have a deep understanding of the 3GPP standard, and can obtain accurate measurement results without time and effort in a state in which the connection between the mobile terminal and a pseudo base station is securely made. Further, the mobile terminal test system according to the present invention can automatically calculate the conformance and nonconformance determination criterion values for the test case, by using various parameters in conformity with the 3GPP standard.

Further, the mobile terminal test system according to the present invention may further include a display control unit that displays the value of the parameter in conformity with the 3GPP standard in a selectable manner, which is settable by the parameter input unit, on a display unit.

With this configuration, since the mobile terminal test system according to the present invention selectably displays the value in conformity with the 3GPP standard, which is settable to various parameters, on the display unit, even if the user does not have a deep understanding of the 3GPP standard, it is possible to perform a change to an appropriate parameter in conformity with the 3GPP standard.

In addition, according to the present invention, there is provided a mobile terminal test method of executing a test of a test case in a conformance test defined by a 3GPP standard of a mobile terminal, the method including: a parameter input step of inputting a value to some of a plurality of parameters for executing the test of the test case; a parameter calculation step of calculating a value of another parameter, according to the value of one or more parameters input in the parameter input step; a standard conformance determination step of determining whether or not the value of the parameter input in the parameter input step and the value of the parameter calculated in the parameter calculation step conform with the 3GPP standard; a parameter adjustment step of adjusting the value of the parameter determined not to conform with the 3GPP standard in the standard conformance determination step to a value in conformity with the 3GPP standard; and a conformance and nonconformance determination criterion value calculation step of calculating a conformance and nonconformance determination criterion value for the test case, by using a plurality of parameters including at least one of a parameter having the value determined to conform with the 3GPP standard in the standard conformance determination step and a parameter having the value adjusted in the parameter adjustment step.

Further, the mobile terminal test method according to the present invention may further include a display control step of displaying the value of the parameter in conformity with the 3GPP standard in a selectable manner, which is settable in the parameter input step, on a display unit.

Advantage of the Invention

The present invention provides a mobile terminal test system and a mobile terminal test method capable of easily executing a conformance test in conformity with a 3GPP standard of a mobile terminal, without making a user aware of a mutual influence of each parameter.

BRIEF DESCRIPTION OF THE DRAWINGS

FIG. 3 is a table illustrating a part of RB Allocation defined in Section 6.1 of 3GPP standard 38.521-1.

BEST MODE FOR CARRYING OUT THE INVENTION

Hereinafter, embodiments of a mobile terminal test system and a mobile terminal test method according to the present invention will be described with reference to the drawings.

Figure 1:
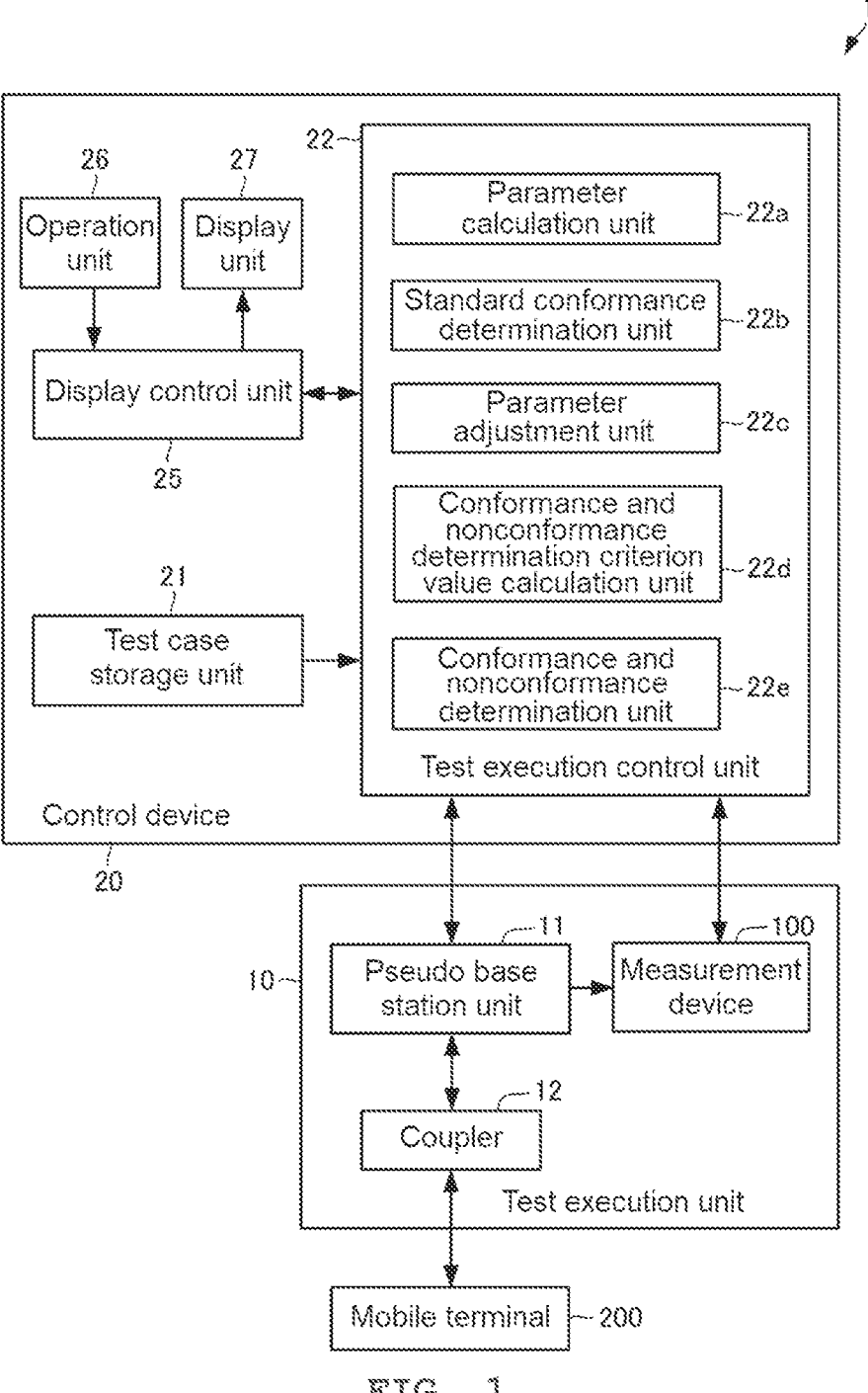
FIG. 1 is a block diagram illustrating a configuration of a mobile terminal test system according to an embodiment of the present invention.

As illustrated in FIG. 1, a mobile terminal test system 1 according to the present embodiment mainly operates as a pseudo base station, and executes a test of test cases in a conformance test of a mobile terminal 200 defined by the 3GPP standard, and includes a test execution unit 10 and a control device 20.

The test execution unit 10 has a pseudo base station unit 11, a coupler 12, and a measurement device 100. Under control of the control device 20, the pseudo base station unit 11 establishes a wireless communication connection or wired communication connection with the mobile terminal 200, and exchanges call connection and signaling messages. In addition, the pseudo base station unit 11 outputs a state and the like of communication with the mobile terminal 200 to the control device 20. The pseudo base station unit 11 and the mobile terminal 200 are coupled via the coupler 12 functioning as an RF port and an RF cable (not illustrated).

The measurement device 100 measures transmission and reception characteristics of the mobile terminal 200. The measurement device 100 can measure, for example, transmission power, Error Vector Magnitude (EVM), IQ constellation, spectrum, and the like, as the transmission characteristics of the mobile terminal 200. Further, the measurement device 100 can measure, for example, a Packet Error Rate (PER), a Frame Reception Rate (FRR), and the like, as the reception characteristics of the mobile terminal 200.

The control device 20 includes a test case storage unit 21, a test execution control unit 22, a display control unit 25, an operation unit 26, and a display unit 27.

The test case storage unit 21 stores a list of test cases for a conformance test in conformity with the 3GPP standard and a plurality of parameters for each test case such as a test condition or a test item.

The test condition is a condition set in the measurement device 100 in order to test a frequency, an intensity, and a phase of an RF signal transmitted and received by the mobile terminal 200. For example, parameters of the test condition are a Test Environment, a frequency (Test Frequency, Operating Band, Downlink Frequency, Uplink Frequency, Downlink Point A, and Uplink Point A), a test bandwidth BW (Test Channel Bandwidth, and Test EN-DC bandwidth combination), Subcarrier Spacing (SCS), Synchronization Signal/PBCH Block (SSB), and the like.

Figure 2:
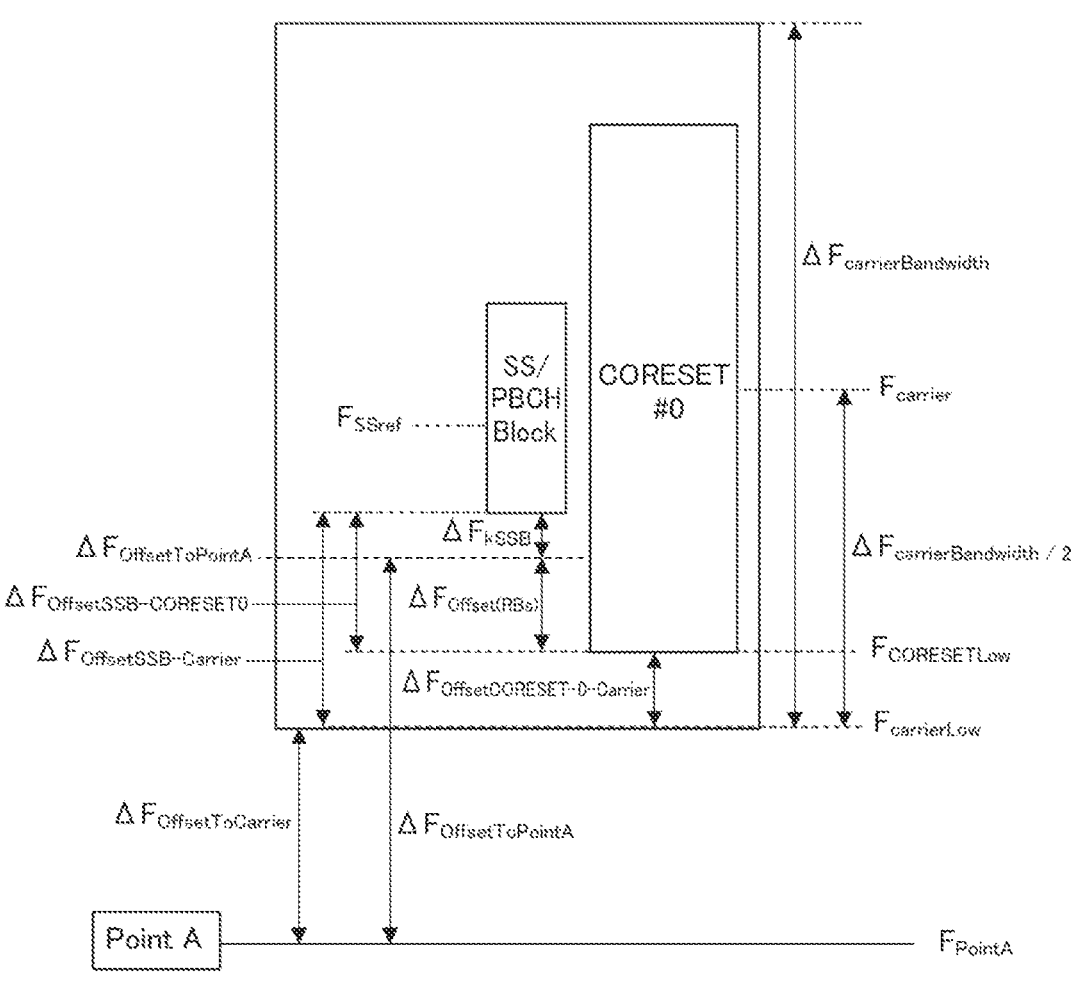
FIG. 2 is a diagram illustrating a positional relationship in one channel of Point A, SSB, and $F_{carrier}$ defined in Section C.1 of 3GPP standard 38.508-1.

FIG. 2 illustrates a positional relationship in one channel of Point A, SS/PBCH Block (SSB), and a center frequency $F_{carrier}$ of carrier defined in Section C.1 of 3GPP standard 38.508-1.

The test item is identified by a Test ID and defined by test parameters such as a modulation scheme (OFDM) and resource block allocation (RB Allocation and RB Allocation Pattern). Each test item is executed for each combination of the parameters of the test condition described above.

FIG. 3 is a table illustrating a part of RB Allocation defined in Section 6.1 of 3GPP standard 38.521-1. When each value of Channel Bandwidth (BW), SCS, and OFDM, and one pattern is determined among eight RB Allocation Patterns (Edge_Full_Left, Edge_Full_Right, Edge_1RB_Left, Edge_1RB_Right, Outer_Full, Inner_Full, Inner_1RB_Left, and Inner_1RB_Right), RB Allocation is determined.

Figure 4:
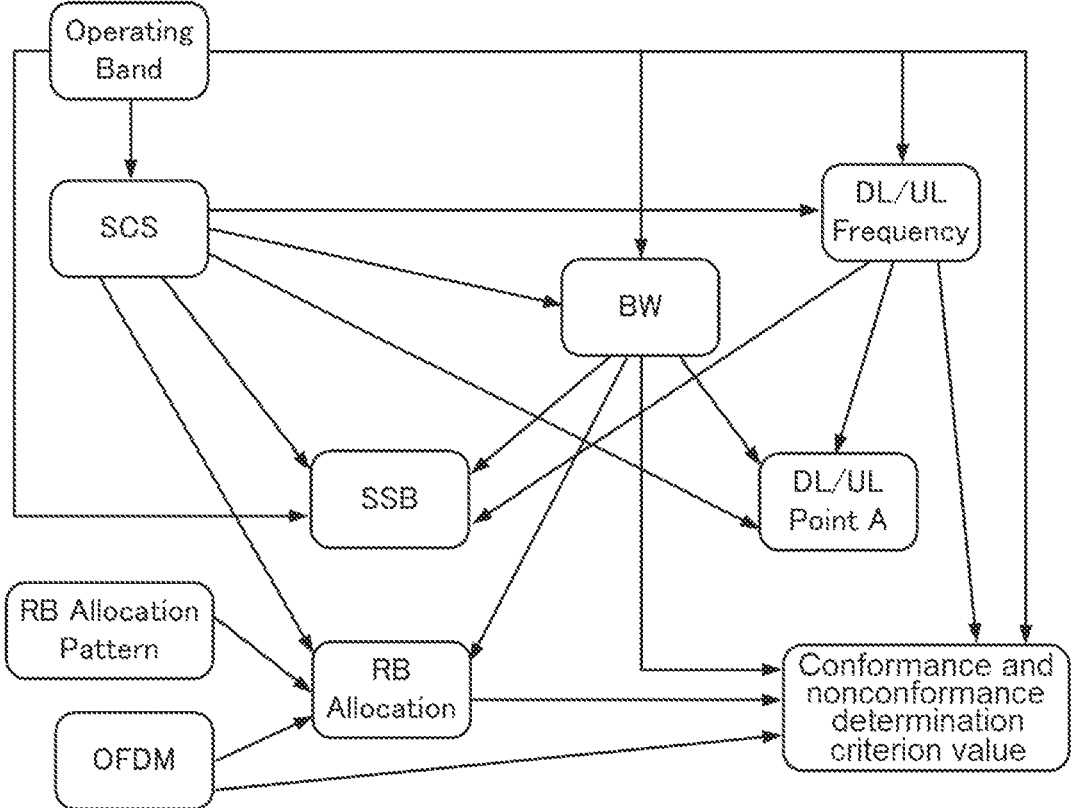
FIG. 4 is a diagram illustrating an interrelationship among a plurality of parameters handled by the mobile terminal test system according to the embodiment of the present invention.

FIG. 4 illustrates an interrelationship among a plurality of parameters handled by the mobile terminal test system 1 according to the present embodiment. First, when Operating Band is determined, one or more combinations of SCS and BW that support Operating Band are determined. Further, when Operating Band and SCS are determined, ranges of Downlink Frequency (hereinafter, also referred to as "DL Frequency") and Uplink Frequency (hereinafter, also referred to as "UL Frequency") are determined.

SSB is determined according to each value of Operating Band, SCS, BW, and DL Frequency. Downlink Point A (hereinafter, also referred to as "DL Point A") and Uplink Point A (hereinafter, also referred to as "UL Point A") are determined according to each value of SCS, BW, DL Frequency, and UL Frequency. RB Allocation is determined according to each value of SCS, BW, OFDM, and RB Allocation Pattern.

A conformance and nonconformance determination criterion value for the test case is determined according to each value of Operating Band, BW, DL Frequency, UL Frequency, OFDM, and RB Allocation.

The display control unit 25 displays an image on the display unit 27, and performs control of generating and displaying the image according to an instruction from the test execution control unit 22. In addition, the display control unit 25 changes the display of the display unit 27 based on information input to the operation unit 26, and transmits the information input to the operation unit 26 to the test execution control unit 22.

The display control unit 25 can also display a value of the parameter in conformity with the 3GPP standard, which is settable by the operation unit 26, on the display unit 27 so as to be selectable by the operation unit 26. For example, the display control unit 25 may display each value of SCS (15 kHz/30 kHz/60 kHz) corresponding to Operating Band input by the operation unit 26 on the display unit 27 so as to be selectable by the operation unit 26. Further, for example, the display control unit 25 may display each value of BW (5 MHz to 100 MHz) corresponding to the combination of Operating Band and SCS input by the operation unit 26 on the display unit 27 so as to be selectable by the operation unit 26. Further, for example, the display control unit 25 may display OFDM (DFT-s/CP) or each value of RB Allocation Pattern (Edge_Full_Left, Edge_Full_Right, Edge_1RB_Left, Edge_1RB_Right, Outer_Full, Inner_Full, Inner_1RB_Left, and Inner_1RB_Right) on the display unit 27 so as to be selectable by the operation unit 26.

The operation unit 26 is for accepting an operation input by a user, and is configured with, for example, a touch panel including a touch sensor for detecting a contact position by a contact operation with an input surface corresponding to a display screen of the display unit 27. Alternatively, the operation unit 26 may include an input device such as a keyboard or a mouse. The operation input to the operation unit 26 is detected by the display control unit 25.

The operation unit 26 constitutes a parameter input unit for the user to input values to some of the plurality of parameters for executing the test of the test case. For example, the operation unit 26 can input values for the parameters such as Operating Band, SCS, BW, DL Frequency, OFDM, and RB Allocation Pattern.

The display unit 27 is configured with a display device such as a liquid crystal display or a CRT, and displays various display contents such as a setting screen or a test result related to test measurement of the test case for the mobile terminal 200 by the measurement device 100 on the display screen, based on display control by the display control unit 25. Further, the display unit 27 displays an operation target such as a button, a soft key, a pull-down menu, and a text box for setting various conditions.

When execution of the conformance test is selected by the operation input of the user to the operation unit 26, the test execution control unit 22 reads out a list of test cases stored in the test case storage unit 21, and causes the display control unit 25 to display the list of test cases on the display unit 27. Further, the test execution control unit 22 controls the measurement device 100 to execute test measurement of a test case selected from the list by an input operation of the user to the operation unit 26.

The test execution control unit 22 also includes a parameter calculation unit 22a, a standard conformance determination unit 22b, a parameter adjustment unit 22c, a conformance and nonconformance determination criterion value calculation unit 22d, and a conformance and nonconformance determination unit 22e.

The parameter calculation unit 22a calculates values of other parameters, according to values of one or more parameter input from the operation unit 26. For example, based on each value of Operating Band, SCS, BW, and DL Frequency input from the operation unit 26, the parameter calculation unit 22a calculates the center frequency $F_{SSref}$ of SSB (hereinafter, also referred to as "SSB value"), by a procedure described in Section C.3 of 3GPP standard 38.508-1. Further, for example, the parameter calculation unit 22a calculates values of DL Point A and UL Point A according to a procedure described in Section C.3 of 3GPP standard 38.521-1.

The standard conformance determination unit 22b determines whether or not the value of the parameter input by the operation unit 26 and the value of the parameter calculated by the parameter calculation unit 22a conform with the 3GPP standard. For example, the standard conformance determination unit 22b determines whether or not DL Frequency input from the operation unit 26 conforms with the values described in Table 5.4.2.3-1 of 3GPP standard 38.521-1. Further, for example, the standard conformance determination unit 22b determines whether or not there is valid SSB fitted in a channel of a carrier when DL Frequency, which is currently set, is regarded as the center frequency $F_{carrier}$ of the carrier.

The parameter adjustment unit 22c adjusts a value of the parameter determined by the standard conformance determination unit 22b not to conform with the 3GPP standard to a value in conformity with the 3GPP standard. For example, in a case where the standard conformance determination unit 22b determines that DL Frequency does not conform with the values described in Table 5.4.2.3-1 of 3GPP standard 38.521-1, the parameter adjustment unit 22c adjusts DL Frequency according to the values described in this Table 5.4.2.3-1. Further, for example, in a case where the standard conformance determination unit 22b determines that there is no valid SSB fitted in a channel of carrier, the parameter adjustment unit 22c adjusts DL Frequency according to the procedure described in Section C.3 of 3GPP standard 38.508-1.

The conformance and nonconformance determination criterion value calculation unit 22d uses a plurality of various parameters including at least one of a parameter having a value determined to conform with the 3GPP standard by the standard conformance determination unit 22b and a parameter having a value adjusted by the parameter adjustment unit 22c to calculate a conformance and nonconformance determination criterion value for the test case. With the test case, the conformance and nonconformance determination criterion value is given as a threshold value or given as an allowable range, in some cases. For example, the standard conformance determination unit 22b determines that the value conforms with the 3GPP standard, or the conformance and nonconformance determination criterion value calculation unit 22d calculates the conformance and nonconformance determination criterion value, based on each value of Operating Band, BW, DL frequency, UL frequency, OFDM, and RB Allocation, which are adjusted by the parameter adjustment unit 22c.

The conformance and nonconformance determination unit 22e determines whether a test result of the test case is PASS or FAIL, based on the measurement result by the measurement device 100 and the conformance and nonconformance determination criterion value.

The test execution control unit 22 is configured with, for example, a microcomputer or a personal computer including a CPU, a ROM, a RAM, an HDD, and the like, and controls an operation of each unit described above constituting the mobile terminal test system 1. Further, the test execution control unit 22 transfers a predetermined program stored in the ROM or the like to the RAM and executes the program by the CPU, so that at least a part of the parameter calculation unit 22a, the standard conformance determination unit 22b, the parameter adjustment unit 22c, the conformance and nonconformance determination criterion value calculation unit 22d, and the conformance and nonconformance determination unit 22e can be configured by software. At least the part of the parameter calculation unit 22a, the standard conformance determination unit 22b, the parameter adjustment unit 22c, the conformance and nonconformance determination criterion value calculation unit 22d, and the conformance and nonconformance determination unit 22e can be configured by a digital circuit such as Field Programmable Gate Array (FPGA) or Application Specific Integrated Circuit (ASIC). Alternatively, at least the part of the parameter calculation unit 22a, the standard conformance determination unit 22b, the parameter adjustment unit 22c, the conformance and nonconformance determination criterion value calculation unit 22d, and the conformance and nonconformance determination unit 22e can be configured by appropriately combining a hardware process by a digital circuit and a software process by a predetermined program.

Figure 5:
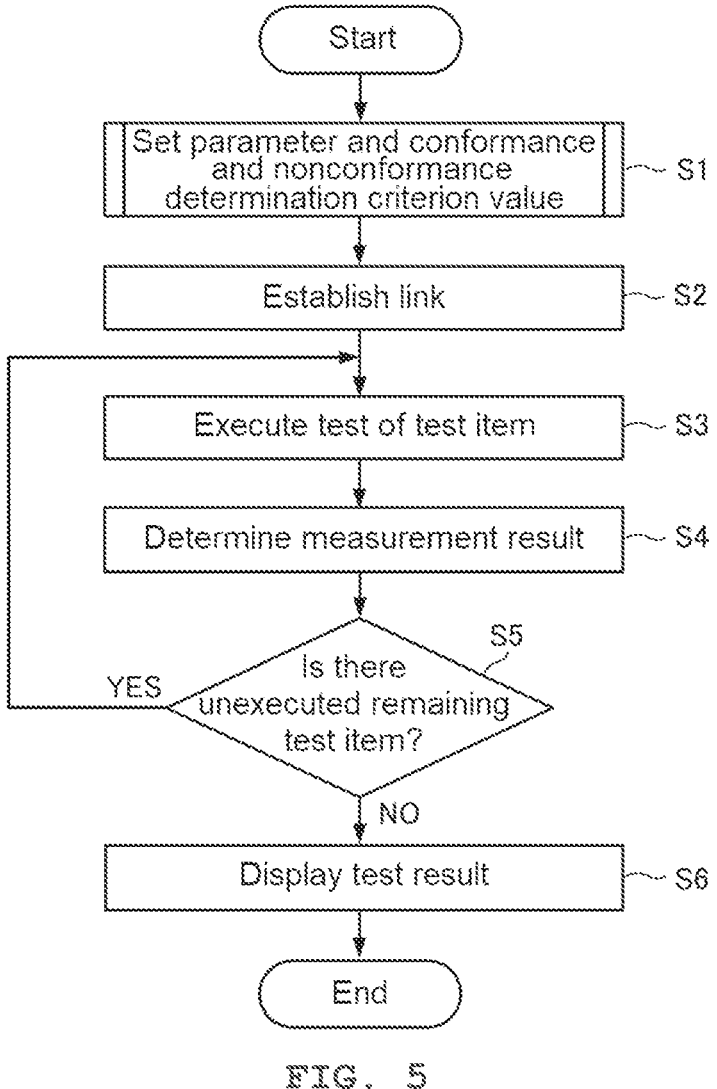
FIG. 5 is a flowchart illustrating a process of a mobile terminal test method using the mobile terminal test system according to the embodiment of the present invention.

Hereinafter, a mobile terminal test method using the mobile terminal test system 1 will be described with reference to the flowchart in FIG. 5.

First, the test execution control unit 22 sets various parameters necessary for executing a test case and a conformance and nonconformance determination criterion value, according to an input operation of the user to the operation unit 26 (step S1). Details of the processing in step S1 will be described below.

Next, the test execution control unit 22 establishes a link (call) between the pseudo base station unit 11 and the mobile terminal 200 (step S2).

Next, the test execution control unit 22 causes the measurement device 100 to execute test measurement of a test item identified by Test ID by using a combination of the various parameters set in step S1 (step S3).

The conformance and nonconformance determination unit 22e determines whether the test result of the test item executed in step S3 is PASS or FAIL, based on the measurement result by the measurement device 100 (step S4).

The test execution control unit 22 determines whether or not there are any tests of unexecuted test items remaining in the combination of various parameters set in step S1 (step S5). In a case where there are the tests of the unexecuted test items remaining in the combination of various parameters set in step S1, the process from step S3 is executed again. On the other hand, in a case where the tests for all the test items are completed in the combination of various parameters set in step S1, the process in step S6 is executed.

The test execution control unit 22 controls a display of the test results of the test items in the combination of various parameters set in step S1 on the display screen of the display unit 27 (step S6).

Figure 6:
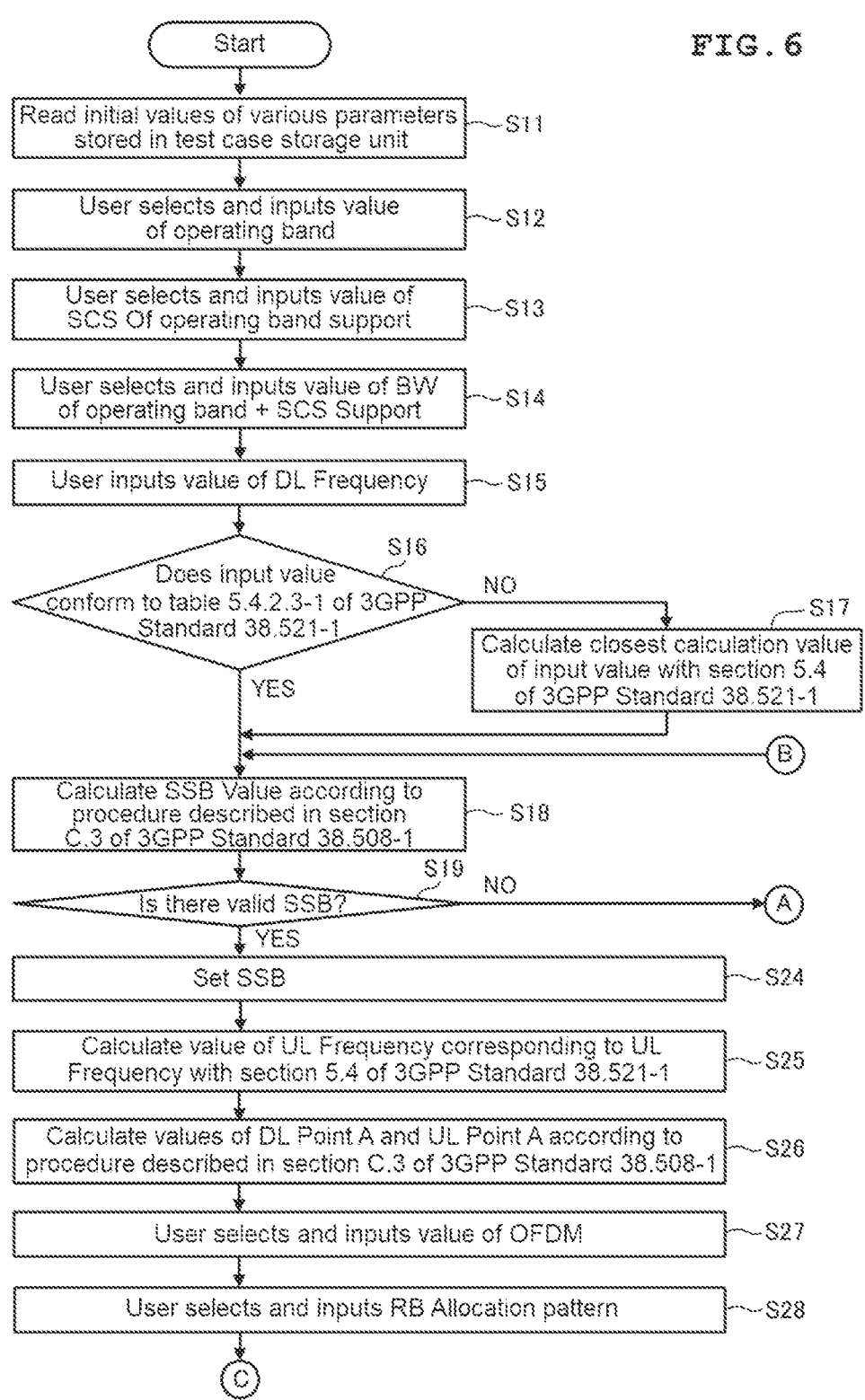
FIG. 6 is a flowchart (part 1) illustrating details of a process in step S1 in the flowchart in FIG. 5.
Figure 7:
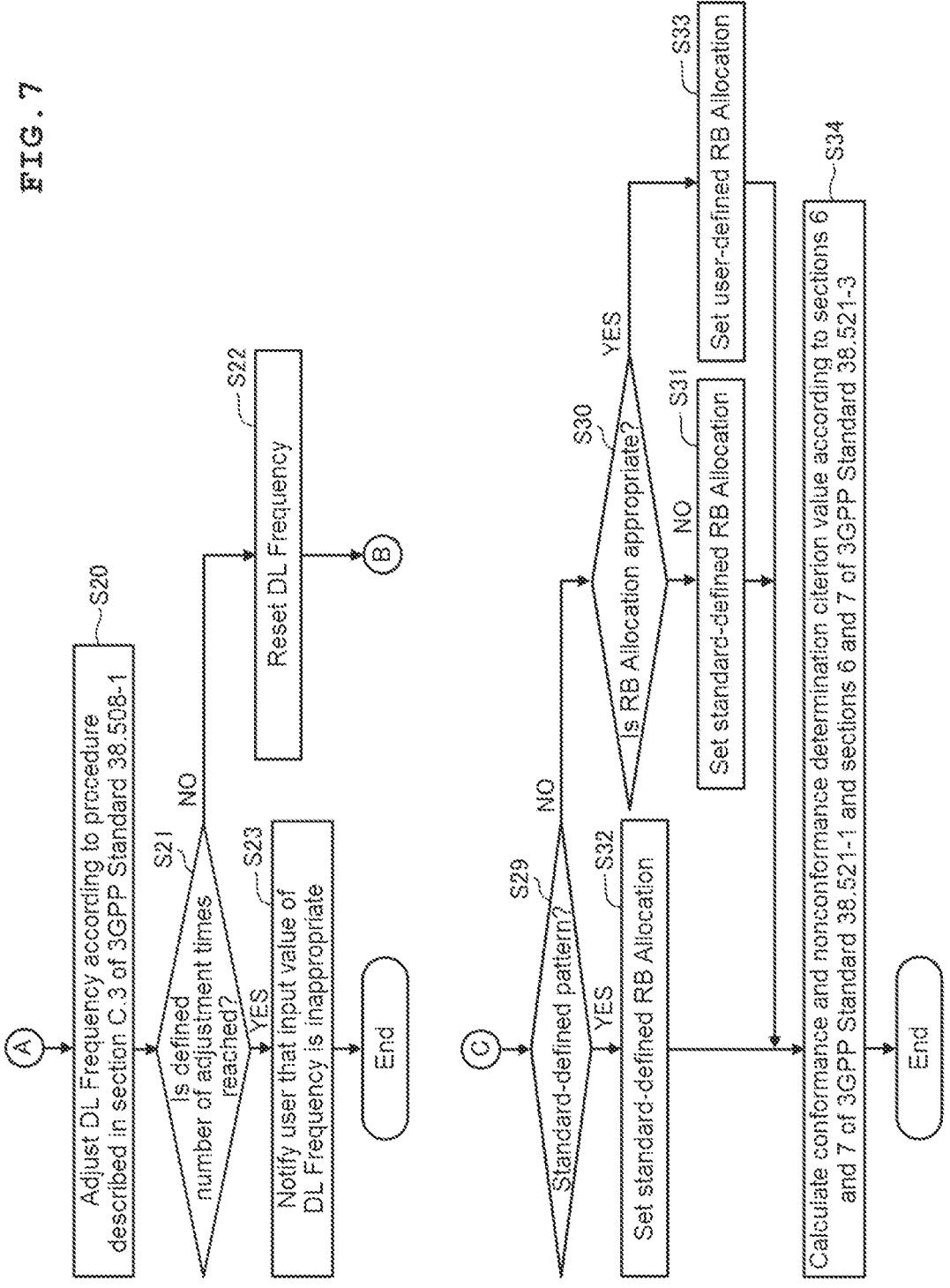
FIG. 7 is a flowchart (part 2) illustrating the details of the process in step S1 in the flowchart in FIG. 5.

Hereinafter, an example of the process in step S1 will be described with reference to the flowcharts of FIG. 6 and FIG. 7.

First, the test execution control unit 22 reads initial values of various parameters stored in the test case storage unit 21 (step S11). Further, the test execution control unit 22 causes the display unit 27 to display the read various parameters in a changeable state via the display control unit 25. For example, the display control unit 25 displays each value of Operating Band in conformity with the 3GPP standard on the display unit 27 so as to be selectable by the operation unit 26.

Next, the user selects and inputs the value of Operating Band via the operation unit 26 (step S12). The test execution control unit 22 sets the value of Operating Band selected and input by the user via the operation unit 26 to Operating Band.

Next, the display control unit 25 displays each value of SCS (15 kHz, 30 kHz, and 60 kHz) supported by Operating Band input in step S12 on the display unit 27 so as to be selectable by the operation unit 26. The user selects and inputs the value of SCS via the operation unit 26 (step S13). The test execution control unit 22 sets the value of SCS selected and input by the user via the operation unit 26 to SCS.

Next, the display control unit 25 displays each value of BW (5 MHz to 100 MHz) corresponding to a combination of Operating Band and SCS input in steps S12 and S13 on the display unit 27 so as to be selectable by the operation unit 26. The user selects and inputs the value of BW via the operation unit 26 (step S14). The test execution control unit 22 sets the value of BW selected and input by the user via the operation unit 26 to BW.

Next, the user inputs a value of DL Frequency within a valid range via the operation unit 26 (step S15). Here, the valid range of DL Frequency is a frequency range described in Table 5.2-1 of 3GPP standard 38.521-1. The test execution control unit 22 sets the value of DL Frequency input by the user via the operation unit 26 to DL Frequency.

Next, the standard conformance determination unit 22b of the test execution control unit 22 determines whether or not the value of DL Frequency input in step S15 conforms with "Downlink Range of $N_{REF}$" illustrated in Table 5.4.2.3-1 of 3GPP standard 38.521-1 (step S16). Here, a conversion relationship between DL Frequency and $N_{REF}$ is represented by following Equations (1) and (2). Here, a range of the values of $\Delta F_{Global}$, $F_{REF\text{-}Offs}$, $N_{REF\text{-}Offs}$, and the value of $N_{REF}$ in Equations (1) and (2) are defined in Table 5.4.2.1-1 of 3GPP standard 38.521-1.

$$\text{DL Frequency} = F_{REF} = F_{REF\text{-}Offs} + \Delta F_{Global}(N_{REF} - N_{REF\text{-}Offs}) \quad (1)$$

$$N_{REF} = (\text{DL Frequency} - F_{REF\text{-}Offs})/\Delta F_{Global} + N_{REF\text{-}Offs} \quad (2)$$

$N_{REF}$ takes a discrete integer value in step size according to Operating Band, as illustrated in Table 5.4.2.3-1 of 3GPP standard 38.521-1. That is, in step S16, the test execution control unit 22 determines whether or not provisional $N_{REF}$ obtained by substituting the value of DL Frequency input in step S15 into Equation (2) coincides with the discrete integer value indicated in Table 5.4.2.3-1 of 3GPP standard 38.521-1.

In a case where provisional $N_{REF}$ coincides with any of the discrete integer values illustrated in Table 5.4.2.3-1 of 3GPP standard 38.521-1, the test execution control unit 22 executes the process in step S18 described below. On the other hand, in a case where provisional $N_{REF}$ does not coincide with any of the discrete integer values illustrated in Table 5.4.2.3-1 of 3GPP standard 38.521-1, the test execution control unit 22 executes the process in step S17.

In step S17, the parameter calculation unit 22a of the test execution control unit 22 calculates the value of DL Frequency from Equation (1), by using a value closest to provisional $N_{REF}$ calculated in step S16, among the discrete integer values of $N_{REF}$ indicated in Table 5.4.2.3-1 of Section 5.4 of 3GPP standard 38.521-1. Further, the test execution control unit 22 sets the calculated value of DL Frequency to DL Frequency (step S17).

For example, in a case where Operating Band is n38, it is assumed that the user inputs 2570.21 MHz, among the values of DL Frequency within the valid range. At this time, with Equation (2), corresponding $N_{REF}$ is 514042, and this value does not coincide with the discrete integer value with a step size of 20 illustrated in Table 5.4.2.3-1. In this case, 514040, which is the closest to 514042, is substituted into Equation (1) as $N_{REF}$, and 2570.2 MHz is calculated and set as new DL Frequency.

In step S18, the parameter calculation unit 22a of the test execution control unit 22 calculates the SSB value $F_{SSref}$ according to the procedure described in Section C.3 of 3GPP standard 38.508-1 by using the currently set values of Operating Band, SCS, BW, and DL Frequency (step S18).

Next, the standard conformance determination unit 22b of the test execution control unit 22 determines whether or not the SSB value $F_{SSref}$ calculated in step S18 is a valid value fitted in a channel of a carrier when currently set DL Frequency is regarded as the center frequency $F_{carrier}$ of the carrier (step S19).

In a case where the SSB value $F_{SSref}$ calculated in step S18 is the valid value, the test execution control unit 22 executes the process in step S24, which will be described below. On the other hand, in a case where the SSB value $F_{SSref}$ calculated in step S18 is not the valid value, the test execution control unit 22 executes the process in step S20.

In step S20, the parameter adjustment unit 22c of the test execution control unit 22 adjusts the value of DL Frequency by shifting $N_{REF}$ by one step size, according to the procedure described in Section C.3 of 3GPP standard 38.508-1 (step S20).

Next, the parameter adjustment unit 22c of the test execution control unit 22 determines whether or not the number of times DL Frequency is adjusted in step S20 reaches the number of adjustment times defined in Section C.3 of 3GPP standard 38.508-1 (step S21).

In a case where the number of times DL Frequency is adjusted in step S20 reaches the number of adjustment times defined in Section C.3 of 3GPP standard 38.508-1, the parameter adjustment unit 22c of the test execution control unit 22 executes the process in step S23, which will be described below. On the other hand, in a case where the number of times DL Frequency is adjusted in step S20 does not reach the number of adjustment times defined in Section C.3 of 3GPP standard 38.508-1, the parameter adjustment unit 22c of the test execution control unit 22 executes the process in step S22.

In step S22, the parameter adjustment unit 22c of the test execution control unit 22 resets DL Frequency to the value adjusted in step S20 (step S22), and executes the process in step S18 again.

For example, when the value of DL Frequency input by the user via the operation unit 26 is 2617 MHz, the value of Operating Band is n38, the value of BW is 5 MHz, and the value of SCS is 15 kHz, the SSB value $F_{SSref}$ calculated in step S18 is determined to be invalid in step S19. In this case, in step S20, the value of DL Frequency is adjusted to 2616.9 MHz, which corresponds to $N_{REF}$ shifted by one step size. The SSB value $F_{SSref}$ calculated again in step S18 by using this value of DL Frequency after the adjustment is 2617.35 MHz, which is determined to be valid in step S19.

In step S23, the parameter adjustment unit 22c of the test execution control unit 22 displays that the value of DL Frequency input by the user via the operation unit 26 in step S15 is an inappropriate value on the display unit 27 via the display control unit 25, ends and a series of processes.

In step S24, the test execution control unit 22 sets the SSB value $F_{SSref}$ determined to be valid in step S19 to SSB (step S24).

Next, the parameter calculation unit 22a of the test execution control unit 22 calculates a value of UL Frequency corresponding to DL Frequency, which is currently set, according to Table 5.4.4-1 in Section 5.4 of 3GPP standard 38.521-1. Further, the test execution control unit 22 sets the calculated value of UL Frequency to UL Frequency (step S25).

Next, the parameter calculation unit 22a of the test execution control unit 22 calculates DL Point A and UL Point A according to the procedure described in Section C.3 of 3GPP standard 38.521-1, based on each value of SCS, BW, DL Frequency, and UL Frequency, which is the currently set. Further, the test execution control unit 22 sets the calculated values of DL Point A and UL Point A to DL Point A and UL Point A (step S26).

Next, the display control unit 25 displays each OFDM value in conformity with the 3GPP standard on the display unit 27 so as to be selectable by the operation unit 26. The user selects and inputs the value of OFDM via the operation unit 26 (step S27). The test execution control unit 22 sets the value of OFDM selected and input by the user via the operation unit 26 to OFDM.

Next, the display control unit 25 displays RB Allocation Pattern on the display unit 27 so as to be selectable by the operation unit 26. The user selects and inputs RB Allocation Pattern via the operation unit 26 (step S28).

Next, the test execution control unit 22 determines whether RB Allocation Pattern input in step S28 is a pattern defined by the 3GPP standard or a pattern defined by a user (step S29).

In a case where RB Allocation Pattern input in step S28 is the pattern defined in the 3GPP standard, the test execution control unit 22 executes the process in step S32, which will be described below. On the other hand, in a case where RB Allocation Pattern input in step S28 is the pattern defined by the user, the test execution control unit 22 executes the process in step S30.

In step S30, the standard conformance determination unit 22b of the test execution control unit 22 determines whether or not RB Allocation corresponding to each value of BW, SCS, and OFDM, which is currently set, is an appropriate value, with RB Allocation Pattern defined by the user, which is input in step S28 (step S30). Here, appropriate RB Allocation is RB Allocation in which $L_{CRB}$ has a value equal to or more than 1 and $L_{CRB}$, $RB_{start}$, and $L_{CRB}+RB_{start}$ do not exceed $L_{CRB}$ of Outer_Full described above in a format "$L_{CRB}@RB_{start}$" of RB Allocation.

In a case where RB Allocation is an appropriate value, the test execution control unit 22 executes the process in step S33, which will be described below. On the other hand, in a case where RB Allocation is not an appropriate value, the test execution control unit 22 executes the process in step S31.

In step S31, the test execution control unit 22 sets a value according to each value of BW, SCS, and OFDM, which is currently set, from any of eight default RB Allocation Patterns defined in the 3GPP standard, as RB Allocation (step S31). Further, the test execution control unit 22 causes the display control unit 25 to display that RB Allocation Pattern selected and input by the user via the operation unit 26 is an inappropriate pattern, on the display unit 27.

In step S32, the test execution control unit 22 sets a value according to each value of BW, SCS, and OFDM, which is currently set, in RB Allocation Pattern defined in the 3GPP standard, input in step S28, as RB Allocation (step S32).

In step S33, the test execution control unit 22 sets a value according to each value of BW, SCS, and OFDM, which is currently set, in RB Allocation Pattern defined by the user, input in step S28, to RB Allocation (step S33).

Next, the conformance and nonconformance determination criterion value calculation unit 22d of the test execution control unit 22 calculates a conformance and nonconformance determination criterion value of a test case, according to a procedure described in Sections 6 and 7 of the 3GPP standard 38.521-1 and Sections 6 and 7 of the 3GPP standard 38.521-3 (step S34).

Among the process steps described above, steps S12 to S15, S27, and S28 correspond to a parameter input step of inputting values to some of a plurality of parameters for executing a test of a test case. In addition, steps S11, S13, S14, S27, and S28 correspond to a display control step of causing the display unit 27 to selectably display a value of the parameter in conformity with the 3GPP standard, which is settable by the operation unit 26.

Further, among the process steps described above, steps S17, S18, S25, and S26 correspond to a parameter calculation step of calculating values of other parameters, according to one or more parameter values input in the parameter input step.

In addition, among the process steps described above, steps S16, S19, and S30 correspond to a standard conformance determination step of determining whether or not the value of the parameter input in the parameter input step and the value of the parameter calculated in the parameter calculation step conform with the 3GPP standard.

Further, among the process steps described above, steps S20 to S23 correspond to a parameter adjustment step of adjusting the value of the parameter determined not to conform with the 3GPP standard in the standard conformance determination step to the value in conformity with the 3GPP standard.

In addition, among the process steps described above, step S34 corresponds to a conformance and nonconformance determination criterion value calculation step of calculating a conformance and nonconformance determination criterion value of a test case, by using a plurality of various parameters including at least one of a parameter having a value determined to conform with the 3GPP standard in the standard conformance determination step and a parameter having the value adjusted in the parameter adjustment step.

As described above, the mobile terminal test system 1 according to the present embodiment is configured such that in a case where a parameter changed by a user and a parameter calculated based on the parameter changed by the user do not conform with the 3GPP standard, their parameters are adjusted to values in conformity with the 3GPP standard. With this configuration, the mobile terminal test system 1 according to the present embodiment enables the user to freely change the parameter without being aware of a mutual influence of each parameter, and can easily execute a conformance test in conformity with the 3GPP standard on the mobile terminal 200. That is, the mobile terminal test system 1 according to the present embodiment facilitates construction and modification of a test condition even if the user does not have a deep understanding of the 3GPP standard, and can obtain accurate measurement results without time and effort in a state in which the connection between the mobile terminal 200 and a base station (pseudo base station unit 11) is securely made.

Further, the mobile terminal test system 1 according to the present embodiment can automatically calculate parameters such as DL Frequency, UL Frequency, DL Point A, UL Point A, and SSB, based on the parameter changed by the user. In addition, the mobile terminal test system 1 according to the present embodiment can interlock and set the values in conformity with the 3GPP standard, for a combination of the parameters such as Operating Band|SCS|BW and BW|SCS|OFDM|RB Allocation Pattern.

Further, the mobile terminal test system 1 according to the present embodiment can automatically calculate the conformance and nonconformance determination criterion values for the test case, by using various parameters in conformity with the 3GPP standard.

In addition, since the mobile terminal test system 1 according to the present embodiment selectably displays the value in conformity with the 3GPP standard, which is settable to various parameters, on the display unit 27, even if the user does not have a deep understanding of the 3GPP standard, it is possible to perform a change to an appropriate parameter in conformity with the 3GPP standard.

DESCRIPTION OF REFERENCE NUMERALS AND SIGNS

1: mobile terminal test system
10: test execution unit
11: pseudo base station unit
12: coupler
20: control device
21: test case storage unit
22: test execution control unit
22a: parameter calculation unit
22b: standard conformance determination unit
22c: parameter adjustment unit 22*d*: conformance and nonconformance determination criterion value calculation unit 22*e*: conformance and nonconformance determination unit 25: display control unit 26: operation unit (parameter input unit)

27: display unit

100: measurement device

200: mobile terminal

What is claimed is:

1. A mobile terminal test system that executes a test of a test case in a conformance test defined by at least one 3rd Generation Partnership Project (3GPP) standard of a mobile terminal, the mobile terminal test system comprising:

a parameter input unit that inputs a value to some of a plurality of parameters for executing the test of the test case;

a parameter calculation unit that calculates a value of another parameter, according to the value of one or more parameters input by the parameter input unit;

a standard conformance determination unit that determines whether or not the value of the parameter input by the parameter input unit and the value of the parameter calculated by the parameter calculation unit conform with the at least one 3GPP standard;

a parameter adjustment unit that automatically adjusts the value of the parameter determined not to conform with the at least one 3GPP standard by the standard conformance determination unit to a value in conformity with the at least one 3GPP standard; and a conformance and nonconformance determination criterion value calculation unit that calculates a conformance and nonconformance determination criterion value for the test case, by using a plurality of parameters including at least one of a parameter having the value determined to conform with the at least one 3GPP standard by the standard conformance determination unit and a parameter having the value adjusted by the parameter adjustment unit, wherein the determination of whether or not the value of the parameter input and the value of the parameter calculated conform with the at least one 3GPP standard is based on a comparison to a table of standards, and wherein the parameter adjustment unit is configured to automatically adjust the value of the parameter determined based on a table of standards.

2. The mobile terminal test system according to claim 1, further comprising:

a display control unit that displays the value of the parameter in conformity with the at least one 3GPP standard in a selectable manner, which is settable by the parameter input unit, on a display unit.

3. A mobile terminal test method of executing a test of a test case in a conformance test defined by at least one 3rd Generation Partnership Project (3GPP) standard of a mobile terminal, the method comprising:

a parameter input step of inputting a value to some of a plurality of parameters for executing the test of the test case;

a parameter calculation step of calculating a value of another parameter, according to the value of one or more parameters input in the parameter input step;

a standard conformance determination step of determining whether or not the value of the parameter input in the parameter input step and the value of the parameter calculated in the parameter calculation step conform with the at least one 3GPP standard;

a parameter adjustment step of automatically adjusting the value of the parameter determined not to conform with the at least one 3GPP standard in the standard conformance determination step to a value in conformity with the at least one 3GPP standard; and a conformance and nonconformance determination criterion value calculation step of calculating a conformance and nonconformance determination criterion value for the test case, by using a plurality of parameters including at least one of a parameter having the value determined to conform with the at least one 3GPP standard in the standard conformance determination step and a parameter having the value adjusted in the parameter adjustment step, wherein the standard conformance determination step is based on a comparison to a table of standards, and wherein the adjustment in the parameter adjustment step is based on a table of standards.

4. The mobile terminal test method according to claim 3, further comprising:

a display control step of displaying the value of the parameter in conformity with the at least one 3GPP standard in a selectable manner, which is settable in the parameter input step, on a display unit.

* * * * *